UNITED STATES PATENT OFFICE.

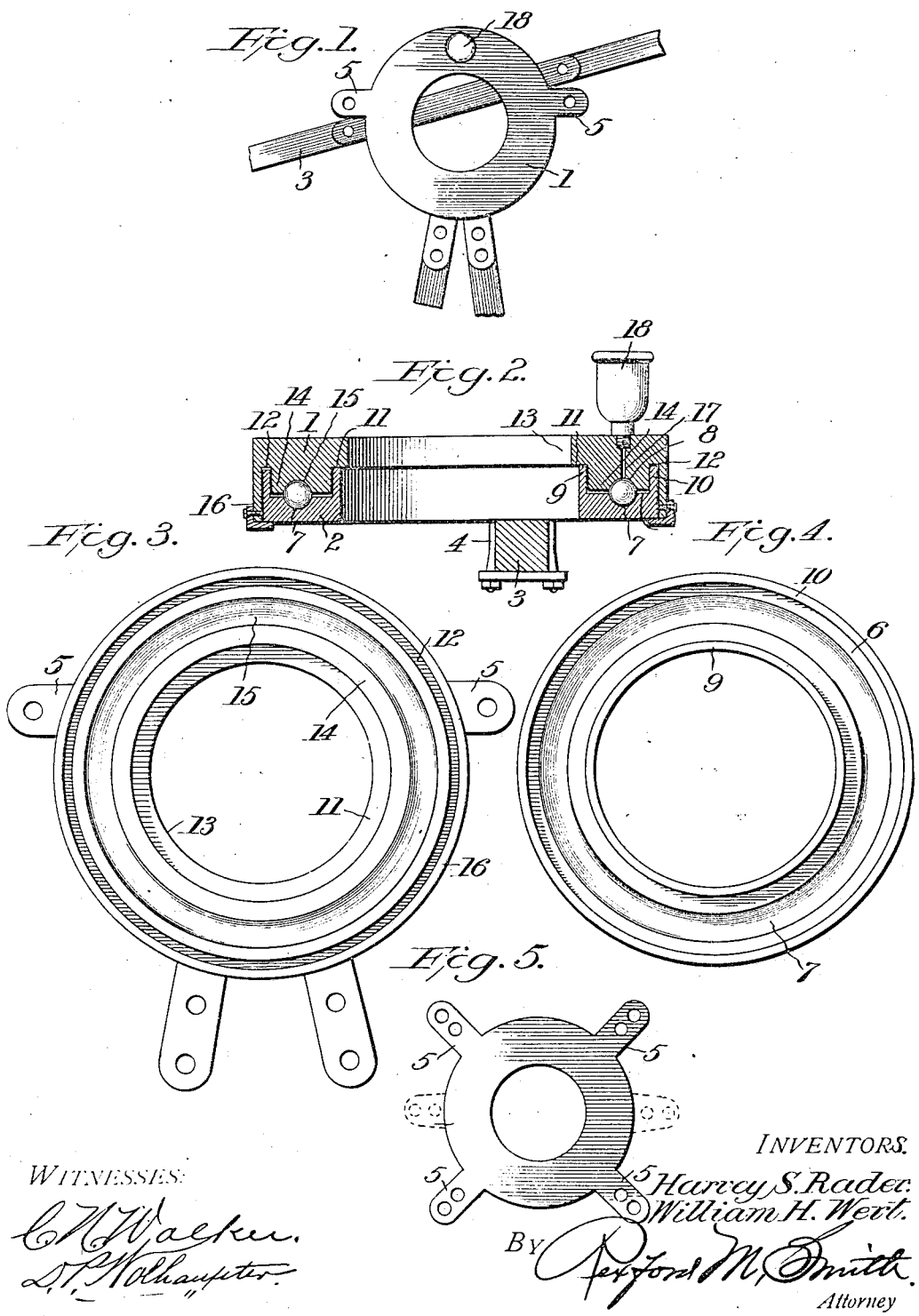

HARVEY S. RADER AND WILLIAM H. WERT, OF PALMERTON, PENNSYLVANIA.

FIFTH-WHEEL.

No. 818,787. Specification of Letters Patent. Patented April 24, 1906.

Application filed July 1, 1905. Serial No. 267,936.

*To all whom it may concern:*

Be it known that we, HARVEY S. RADER and WILLIAM H. WERT, citizens of the United States, residing at Palmerton, in the county of Carbon and State of Pennsylvania, have invented a certain new and useful Fifth-Wheel, of which the following is a specification, reference being had therein to the accompanying drawings.

This invention relates to fifth-wheels for vehicles, the object of the invention being to provide a fifth-wheel adapted for use on all classes of vehicles, including carriages, wagons, and cars, embodying a construction employing an antifriction ball-bearing and flanged bearing members or wheel-segments so relatively arranged as to form complemental ball-races and guards which exclude dust, dirt, and other foreign matter from the balls and ball-races and also adapt said parts to be automatically and thoroughly lubricated and to retain the lubricating material in the ball-races and around the balls.

With the above and other objects in view the invention consists in the novel construction, combination, and arrangement of parts, as herein fully described, illustrated, and claimed.

In the accompanying drawings, Figure 1 is a plan view of a fifth-wheel embodying the present invention, showing a portion of the running-gear with which the same is associated. Fig. 2 is an enlarged diametrical section through the same. Fig. 3 is a bottom plan view of the upper wheel member. Fig. 4 is a top plan view of the lower wheel member. Fig. 5 is a reduced top plan view of the fifth-wheel, showing a modified arrangement of attaching-lugs.

Like reference-numerals designate corresponding parts in all figures of the drawings.

The fifth-wheel contemplated in this invention embodies upper and lower members 1 and 2, respectively, each of said members being circular in shape and the two members being approximately the same in size and superimposed one upon the other, the lower member being secured to the vehicle-axle (shown at 3) by means of the usual clips 4, while the upper member is provided with lugs 5, by means of which it is attached to the bolster or body of the vehicle. The lugs 5 are placed opposite each other when the member is to be attached to the bolster; but they may be arranged at various intervals, as shown in Fig. 5, where the member is to be secured to a car-body or truck-frame.

The lower member 2 is provided with a parallel-sided circular channel 6, in the floor or base of which is formed a secondary and smaller circular channel 7, which is semicircular in cross-section and forms part of the ball-race, in which a circular series of antifriction-balls 8 travel. In providing the channel 6 opposing upstanding flanges 9 and 10 are provided, and the upper member is correspondingly rabbeted, as shown at 11, and grooved, as shown at 12, to receive the flanges 9 and 10, said flanges serving to retain the lubricating-oil and supply the same constantly to the balls, the overhanging inner edge 13 of the upper member acting to exclude water, dirt, and other foreign matter from the bearing. The upper member is also formed with a depending annular bearing-surface 14, which is provided in its lower face with a circular channel or ball-race 15, in which the upper portions of the balls move.

The upper member is provided along its outer edge with a pendent annular flange or rim 16, which fits around the lower member, so as to turn freely thereon, and said flange or rim excludes dirt, dust, water, and other foreign matter from the balls and ball-races. The upper member is also provided with an oil-hole 17 and has secured thereto in line with said hole an oil-cup 18, which may be filled with oil and waste, the oil being fed therefrom automatically to the balls.

By the construction described the lubricating material is automatically feed to the ball-races and distributed around the balls and retained in place, while dust, dirt, water, and other foreign matter are effectively excluded, thus prolonging the life and adding greatly to the durability and ease of operation of the device as a whole.

Having thus described the invention, what is claimed as new is—

1. The herein-described fifth-wheel comprising a lower member having concentric upstanding flanges and a ball-race intermediate between said flanges, an upper member having a circular bearing portion working between said flanges and provided with a ball-race opposite the first-named ball-race and also having an annular guard or rim which encircles the lower member, antifriction-balls working in the ball-race, and means for feeding lubricating material to the balls and ball-race.

2. The herein-described fifth-wheel embodying a lower member having concentric upstanding flanges and an intermediate ball-race groove, an upper member having a bearing portion working between said flanges and provided with a ball-race groove, said upper member being grooved and rabbeted to receive said flanges and also having an annular guard or rim encircling the lower member, and a portion which overhangs the lower member at the inner edge, antifriction-balls arranged in the ball-race grooves, and an oil-cup communicating with the ball-race grooves.

In testimony whereof we affix our signatures in presence of two witnesses.

HARVEY S. RADER.
WM. H. WERT.

Witnesses:
CHAS. H. HAUK,
F. J. SMITH.